Dec. 24, 1957    S. L. ATKINSON    2,817,537
TRAILER FOR BOATS OR THE LIKE
Filed Dec. 2, 1954    2 Sheets-Sheet 1
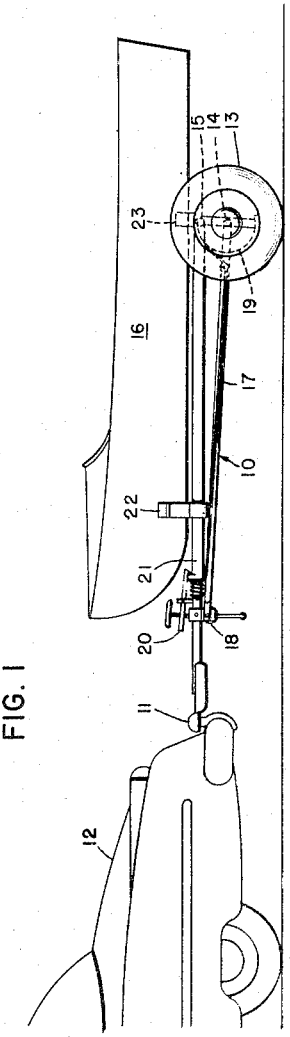
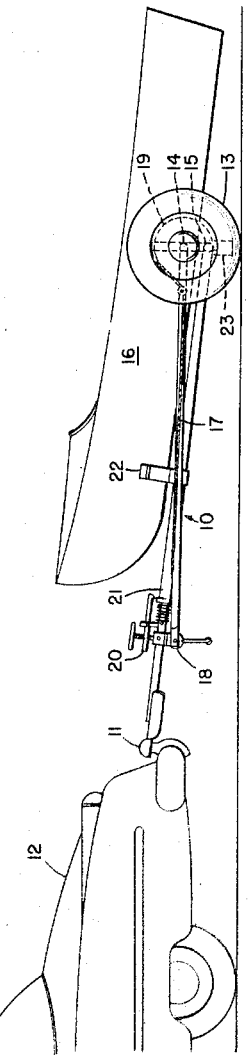
INVENTOR.
SID L. ATKINSON
BY
*David Rabin*
ATTORNEY Dec. 24, 1957
S. L. ATKINSON
2,817,537
TRAILER FOR BOATS OR THE LIKE
Filed Dec. 2, 1954
2 Sheets-Sheet 2
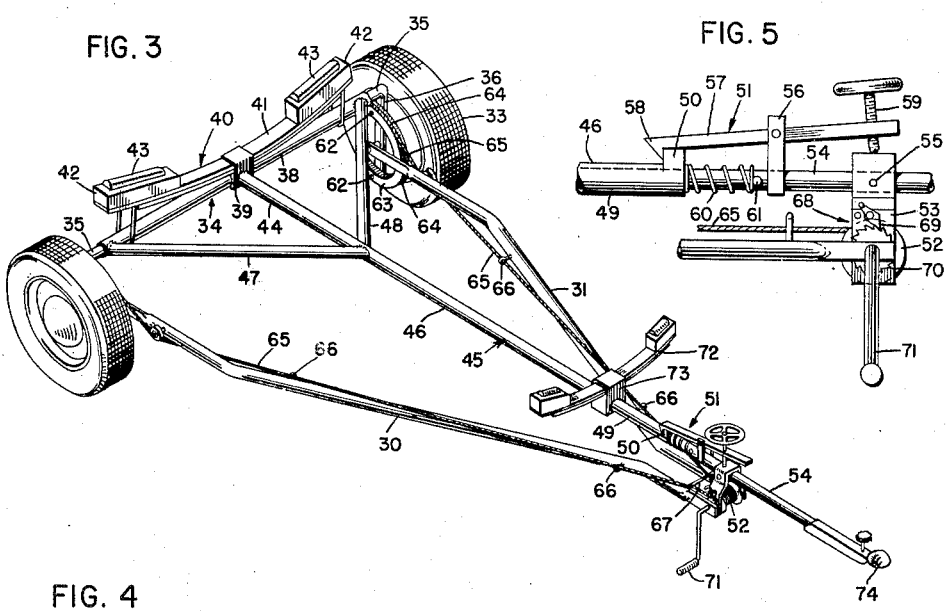
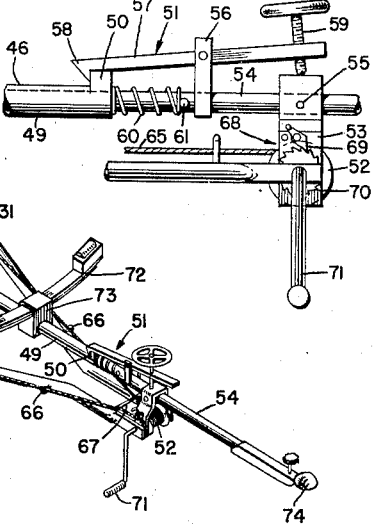
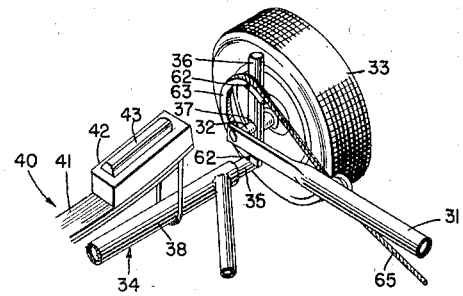
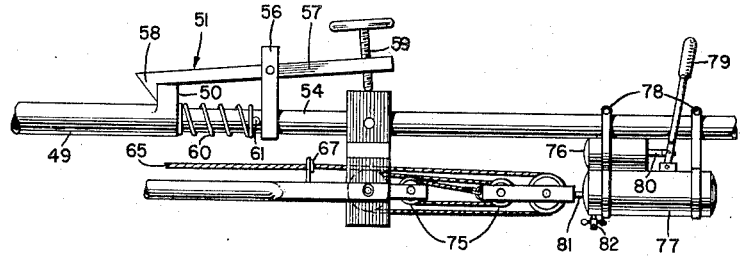
INVENTOR.
SID L. ATKINSON
BY
David Rabin
ATTORNEY

United States Patent Office 2,817,537
Patented Dec. 24, 1957

2,817,537

TRAILER FOR BOATS OR THE LIKE

Sid L. Atkinson, Durham, N. C.

Application December 2, 1954, Serial No. 472,586

14 Claims. (Cl. 280—44)

This invention relates to a vehicular articulated structure used as trailers and relates more particularly to that specific type of trailer in which a rear load supporting framwork is pivotable in a vertical plane and may be lowered or raised relative to a stationary part of the framework.

Conventional trailers employed for transporting a small boat require the use of considerable lifting and manipulation before the boat may be removed from the trailer framework and be made ready for launching into the water. Also considerable lifting is usually necessary to place the boat back on the trailer when the boat is withdrawn from the water and is to be transported to another location. Although several various types of framework have been employed on boat trailers they are principally directed to lowering or raising the entire framework.

Therefore, it is the object of this invention to provide a vehicular trailer having a supplementary framework which will facilitate raising or lowering a long object such as a boat with a minimum effort.

Another object of this invention is to provide a trailer framework in which one end of the framework may be made to pivot relative to a fixed framework structure and thereby elevate or lower a boat structure as required.

Still another object of this invention is to provide a novel means for lowering a boat or the like having spaced apart cable operated drum sectors which support a load carrying transverse member whereby upon cable release the transverse member may be lowered.

A further object of the present invention is to provide a trailer with an extensible linkage means for pivoting a transverse load supporting member from a lowered to an elevated position.

Yet a further object of the present invention is to provide a trailer framework in which a transverse load supporting member is capable of rotating in a vertical plane within a tubular sleeve that is guidingly released through a telescoping linkage means without upsetting or rotating a supported load.

Still another object of this invention is to furnish a trailer combination in which a hoisting mechanism may be employed to pivot a transverse load supporting member from a lowered loading position to an elevated transporting position with a minimum of vertical lifting effort expended by an operator.

Further objects of the present invention include the guidance provided by a telescoping linkage so that a supporting saddle may be lowered or raised while remaining in an upright position, the manner in which a load carrying member may be lowered without locking in the lowermost position, facility of locking the apparatus as the final elevated position is reached.

Other objects and advantages will be readily apparent to those skilled in this art during the course of the following general and detailed description of one embodiment of the present invention had in conjunction with the accompanying drawings which form a part of this specification and in which:

Fig. 1 is a side elevational view of a trailer supporting a boat in an elevated carrying position and made in accordance with the present invention:

Fig. 2 is a side elevational view similar to Fig. 1 illustrating the present embodiment of the invention while in the lowered position;

Fig. 3 is an enlarged perspective view of the present invention illustrating the trailer in an elevated locked position in combination with a hand operable hoisting mechanism;

Fig. 4 is an enlarged fragmentary perspective view of one portion of the elevating mechanism adjacent a wheel;

Fig. 5 is an enlarged fragmentary side elevational view of a manually operable hoisting means and the telescoping linkage and locking means illustrating the elevated locked position;

Fig. 6 is an enlarged fragmentary side elevational view of a manually operable pneumatic hoisting means in a vertical locked position.

Referring to the drawings in which like numerals designate the same parts throughout the several views, and more particularly to Figs. 1 and 2 wherein there is illustrated the present invention comprising broadly, a trailer framework 10 which is hitched by the hitching coupling 11 to the rear of a motor vehicle 12 and extends rearwardly to rotatably support the wheels 13 that are mounted to the framework 10 through the axle assemblies 14, and a transverse rear load supporting structure 15 which is pivotally connected to elevate or lower a boat 16 or other long structure by use of a flexible connector 17 that extends from a manually operable hoisting mechanism 18 to an arcuate sector track 19 which is cooperatively fastened to the load supporting member 15. A releasable locking mechanism 20 is provided in order to retain a telescopic tube linkage 21 in a retracted position thereby maintaining the load supporting structure 15 in an elevated position during transportation of the boat 16 from one location to another. Boat receiving saddles 22 and 23 are provided to support the boat 16 against sliding from the trailer.

The embodiment illustrated in Fig. 3 shows the specific details of the present invention, namely, the tubular side frame members 30 and 31 that are spaced apart at the rear section of the trailer and converge at the forward end to form substantially an A-framework. The rear portion of each of the frame members 30 and 31 is drilled to carry a stub axle assembly 32 on which a wheel 33 is rotatably mounted. A pivotable load supporting structure 34, which when assembled is substantially an inverted U-shaped member comprises a horizontal transverse bar 35 that reaches between the spaced apart frame members 30 and 31 at the rear section and has a depending leg member 36 at each end. Each leg member 36 is fastened to or radially extends normally from the end of the transverse bar 35 (only one shown) and lies in the same plane therewith. Each depending leg member 36 has a hole 37 drilled intermediate its length to receive the axle member 32 therethrough in order to pivot the load supported structure about the axle as a pivot point. The transverse bar 35 is encircled by a tubular sleeve member 38 for a portion of the bar length, however, the bar 35 is to remain free to rotate within the sleeve 38 during the elevating or lowering position.

A bracket 39 is centrally clamped to the tubular sleeve member 38 to support a suitable boat receiving saddle 40 on sleeve 38. Although the saddle 40 illustrated is constructed of leaf springs 41 and mounting pads 42 and rollers 43 which rotate within the pads 42 at the distal ends of the springs 41, other conventional saddles or supporting means may be mounted on the sleeve 38. Bracket 39 is also made to receive the rear end 44 of a telescoping tube linkage 45 that extends forwardly to the converging section of the side frame mebers 30, 31. The rear end 44 of the rear telescoping tube 46 may be fastened to the bracket 39 as by welding or by a threaded connection. Diagonal cross-brace members 47 and 48 are fastened as by welding to the end of the transverse sleeve member 38 and each cross-brace member reaches to a point intermediate the length of the rear telescoping tube 46 to provide added rigidity to the pivotable rear load supporting framework.

The forward end 49 of the rear tube 46 is provided with a projection 50 for locking engagement with a pivotable latch mechanism 51. As is clearly shown in Fig. 5 at the converging section of the side frame members 30 and 31 there is provided therebetween a conventional winding reel or winch 52 rotatably mounted in the yoke 53. Extending through the yoke 53 is the mating forward tube section 54 which slides into the rear tube 46 to make up the telescoping linkage 45. A suitable fastening means, such as the pin 55, furnishes the requisite pivotal movement for the forward section of the telescoping linkage 45. However, the forward tube section 54 may be welded to the yoke 53. Side plates 56 are welded to the tube section 54 and are drilled to pivotably receive the pivotable latch member 57. The opposite end from the engaging lug 58 of the latch member 57 is tapped to threadably receive a hand locking screw 59 which will pivot the engaging lug 58 into or out of locking engagement with the projection 50. Spring 60 encircles an intermediate portion of the tube section 54 which is provided with a stop pin 61 so that the rear tube 46 will be urged rearwardly in order to maintain locking engagement of the rear section during transportation of a load. A conventional trailer hitching coupling 74 is provided at the forward end of the tube section 54 to engage with a mating socket joint fixed to a vehicle bumper.

Fastened as by bolts 62 or other suitable means to each depending leg member 36 is an arcuate sector or drum 63 that is provided with a peripherally grooved track 64 of sufficient depth to retain therein a flexible cable 65. The arcuate sectors 63 may be bent from channel iron or may be solid disks having a peripheral groove machined or cast into the circumference. It will be noted that it is not necessary to provide a complete circular ring since the arc of rotation for the rear load supporting member 34 is limited to approximately 180 degrees of rotation from the lowered to the top elevated position. To prevent undue cable wear it has been found desirable to turn or machine the end of the sectors inwardly.

Individual reaches of cable 65 may be fastened to the peripherally grooved track 64 by any suitable means (not shown) preferably so that the cable may be removed readily for auxiliary hoisting, to be described hereinafter. One means for securing the cable that has been found satisfactory is to slide a knotted cable end through an elongated tapered hole in one end of the track 64 and the knot will be on the inner periphery of the sector, however, other clamping means may be employed. The cable 65 extends forwardly through the guide rings 66 spaced along the side frame members 30 and 31 and between the strap 67 to be wrapped around the reel 52, as shown in Figs. 3 and 5. A conventional releasable ratchet and pawl mechanism 68 is used in conjunction with the drum 52 so that as the cable 65 is wound on the drum it will raise the transverse supporting framework 34 to the desired elevated position. To lower the supporting framework the pawl 69 may be shifted laterally or pivoted in order to be disengaged from the ratchet 70 so that the drum will then be free to rotate. Normally the operator will control the lowering of the rear supporting framework by retarding rotation of the drum 52 by use of a hand crank 71 which is keyed to the drum 52.

To provide for greater support during transportation an additional saddle 72 for receiving the bow of the boat is mounted on the forward end 49 of the rear tube 46 by the bracket 73. Suitable clamping cables may be used to lash the boat to the trailer saddles when necessary.

A modified embodiment of a hoisting mechanism is illustrated in Fig. 6 and comprises a pneumatic system in which a group of pulleys 75 is arranged to provide the desired mechanical advantage required to hoist the cables 65 sufficiently to raise or lower the rear transverse load supporting framework 34. Since the telescoping tube linkage 45 and framework 34 are substantially identical in both embodiments only the pneumatic system will be described here. The forward tube 54 of the telescoping linkage 45 is extended to accommodate the cylinders 76 and 77 that are supported from the forward tube 54 by spaced straps 78. Hand operated lever 79 is pivotally connected to the top of the cylinder 76. Piston rod 80 is provided with piston (not shown) which is reciprocated in the cylinder 76 upon oscillation of the lever 79 to compress air and move a piston (not shown) in cylinder 77 to the right. The piston in cylinder 77 is connected by the rod 81 to the movable side of the pulley system 75. Therefore, upon lever actuation the piston in cylinder 77 will be forced to the right displacing the right side of the pulley which will then take up sufficient cable to raise the rear framework 34 to the desired elevation. When the rear framework structure is elevated sufficiently it will then engage with the locking mechanism 51 to support the rear framework in the elevated position. To lower the rear load supporting structure 34 it is only necessary then to open the valve 82 gradually in order to relieve the pressure within the cylinder 77. It will be readily apparent to one skilled in the mechanical art that a system of check valves and a vent may be provided in a pneumatic system where required or that a closed hydraulic system may be substituted for the simple pneumatic system described.

In operation, when a boat 16 is to be loaded on a trailer framework 10 the cable 65 may be removed from the sectors 63 and tied to the bow of the boat. By using the hoisting mechanism provided the boat may be pulled into position on the lowered rear load supporting framework and positioned in the saddles 40 and 72. When the boat is then properly positioned, the cables may be re-engaged onto the sectors 63. Upon actuation of the hoisting mechanism the cables will be drawn taut and then pivot the sectors 63 forwardly, in turn raising the rear load supporting structure until the telescoping linkage 45 is drawn to the latch engaging position, see Figs. 3 and 5. The hand locking screw 59 may then be rotated to contact the top of the yoke 53 to lock the lug 58 of the latch member 57 in position against the projection 50 on the rear tube 46. Spring 60 will tend to urge the projection 50 against the latch lug 58. To lower the boat from the elevated position the operator need only release the locking mechanism 51 and retard the movement of the hoisting mechanism while it unwinds thereby gradually lowering the boat to the ground.

Obviously many modifications and variations may be made in the construction and arrangements of the elements in the light of the above teachings without departing from the real spirit and purpose of the invention. It is therefore to be understood that within the scope of the appended claims many modified forms of structure as well as the use of mechanical equivalents may be reasonably included and modifications are contemplated.

What is claimed is:

1. A trailer comprising a trailer frame, said frame being substantially an A-frame and having side frame members converging at one end and spaced apart at the other end, ground engaging wheels rotatably mounted on said other end of the frame members, a transverse load supporting member radially spaced and pivotally connected to the side frame members to elevate a load to the desired position, an arcuate drum sector connected to the transverse load supporting member, a flexible connector engaging the periphery of the drum sector, and hoisting means for receiving said flexible connector whereby the length of the flexible connector will determine the elevation of the transverse load supporting member.

2. A trailer comprising a trailer frame, said frame having longitudinally extending side frame members, ground engaging wheels rotatably mounted on one end of said frame members to vertically space the side frame members from the ground, a hitch coupling connected at the other end of the side frame members for engagement with a hauling vehicle, a transverse load supporting inverted U-shaped member spaced from and pivotally connected to the side frame members to maintain a load in a desired vertically spaced position above the ground, an arcuate drum sector connected to the transverse load supporting member adjacent to one end thereof, flexible cable means engaging the periphery of the drum sector, the extent of cable wrap on the sector periphery determining the elevation of the transverse load supporting member, and a hand operated hoisting means for controlling the length of wrap of the flexible cable on the drum periphery mounted on said side frame members.

3. A trailer comprising a trailer frame, said frame being substantially an A-frame and having side frame members converging at one end and spaced apart at the other end, ground engaging wheels rotatably mounted on said other end of the frame members, a transverse load supporting member spaced from said side members, an arcuate sector mounted to rotate vertically and connected to the transverse load supporting member to pivot same to the desired position, a flexible cable engaging the periphery of the arcuate sector, the extent of cable wrap on the sector periphery determining the elevation of the transverse load supporting member, and hoisting means for receiving the flexible cable to control the length of cable wrap on the sector periphery whereby the transverse load supporting member may be elevated or lowered.

4. A boat trailer comprising a trailer frame, said frame having side frame members converging at one end and spaced apart at the other end, wheels rotatably retained at the other end of the side frame members to support the frame above the ground, an inverted U-shaped articulated member extending transversely between and pivotally connected to the spaced apart ends of the side frame members to support a load at the desired elevation, an arcuate drum sector rotatably connected to a side frame member and fastened to the articulated member for pivotal movement therewith, a hoisting means mounted adjacent the converging end of the side frame members, a flexible cable operatively engaged to said hoisting means and extending to and in wrapped contact with the drum sector periphery, the extent of wrap controlling the elevation of the U-shaped articulated member, a longitudinal telescoping member extending the length of the trailer frame, one end of said telescoping member being connected to the articulated U-shaped member and the other end being fastened to the converging end of the frame, and releasable locking means for retaining the telescoping member in a closed position whereby the articulated member will be retained in the elevated position.

5. A boat trailer comprising a trailer frame, said frame having side frame members converging at one end and spaced apart at the other end, ground engaging wheels rotatably supported on the said other end of the frame members, a hitch coupling attached to the converging end of the frame members, a rear load supporting member extending transversely between the side frame members and pivotally connected thereto, said rear load supporting member having a bar and a radially depending leg extending at each end of said bar and lying in the same plane therewith and additionally a tubular member encircling the transverse bar, an arcuate drum sector attached to a depending leg on the load supporting member, said arcuate drum sector being rotatably mounted on a side frame member to pivot the rear load supporting member in a vertical plane, a telescoping linkage longitudinally extending through the frame, one end of said linkage being fastened to the tubular member and the other end being fastened adjacent to the converging section extension of the side frame members, releasable locking means for retaining the telescoping linkage in a closed position to support the load supporting member in an upright position, hoisting means mounted on a converging section of the frame, and a flexible cable extending from the hoisting mechanism to wrap around a drum sector, the extent of cable wrap around the drum sector periphery determining the relative elevation of the boat supporting members.

6. A boat trailer comprising a trailer frame, said frame having converging side frame members and a hitch coupling at the converging end of the frame, a rear load supporting member extending transversely between the spaced apart section of the side frame members at one end, said rear load supporting member having a transverse bar and a radially depending leg member extending at each end of said bar and lying in the same plane therewith, an arcuate drum sector connected to rotate in a vertical plane relative to a side frame member, said sector being fastened to a depending leg member of the transverse load supporting member and so constructed and arranged to be pivotable therewith, a boat saddle member mounted on the transverse bar to support one end of a boat thereon, manually operable hoisting means to elevate the rear load supporting member, and a flexible connector extending from said hoisting means to a drum sector whereby the load supporting member may be raised or lowered.

7. A boat trailer comprising a trailer frame, said frame having converging side frame members to form a forward converging section and a hitch coupling at the converging section of the frame, a rear load supporting member extending transversely between the spaced apart section of the side frame members, said rear loading supporting member having a transverse bar and a radially depending leg member extending at each end of said bar and lying in the same plane therewith and additionally a tubular sleeve encircling an intermediate section of the transverse bar, a boat saddle mounted on the rear load supporting member and supported on the tubular sleeve, a telescoping linkage longitudinally extending from the converging section of the side frame members to the rear load supporting member, one end of the telescoping linkage being fastened to said tubular sleeve and the other end being fastened to the converging section of the side frame member, releasable locking means for retaining the telescoping linkage in an elevated position, an arcuate sector fastened to each depending leg member, said sectors being supported for rotation in a vertical plane by the side frame members at the spaced apart section, each of said sectors having a grooved periphery, a manually operable hoisting means mounted at the converging section, and flexible connector means on said hoisting means extending along the side frame members to be received within the grooved periphery of the sectors whereby controlled movement of the hoisting means will rotate the sectors and elevate or lower the load supporting member to the desired position.

8. A boat trailer comprising a trailer frame, said frame having side frame members converging at one end to form a front end section and a spaced apart rear section, a hitch coupling and a hoisting means mounted on the front end section, an arcuate sector having a peripheral groove mounted to rotate in a vertical plane on the rear section of the side frame members, a transverse load carrying member mounted in spaced radial relationship and in juxtaposition with said sectors, a tubular sleeve member encircling an intermediate section of the transverse member, a telescoping linkage engaging the tubular member and extending longitudinally to the front end section, releasable locking means for maintaining the telescoping linkage in a retracted position, and a flexible cable engaging said groove sector periphery and extending to said hoisting means whereby upon release of said locking means the rear load carrying member may be lowered by extending the reach of cable from the hoisting means.

9. A trailer comprising a first frame structure and a second frame structure, said first frame structure having longitudinally extending spaced apart members lying in the same plane, wheels rotatably mounted at one end of the spaced apart members to raise the first frame structure a fixed distance above a road grade, coupling means at the other end to hitch the trailer to a vehicle, said second frame structure extending transversely between the first frame structure spaced apart members and rotatably connected thereto to pivot in a vertical arc, a telescoping tube linkage connected to said other end of the first frame and longitudinally reaching to be linked with said second frame structure, and releasable locking means to retain said second frame structure in an elevated position.

10. A trailer comprising a first frame structure and a second frame structure, said first frame structure having longitudinally extending spaced apart members lying in the same plane, wheels rotatably mounted at one end of the spaced apart members to raise the first frame structure a fixed distance above a road level, said second frame structure extending transversely across the first frame structure and rotatably connected to pivot in a vertical arc relative to said first frame structure, a telescoping tube linkage connected to said other end of the first frame and reaching to be linked with said second frame structure, and releasable locking means to retain said second frame structure in an elevated position.

11. A trailer comprising a first frame structure and a second frame structure, said first frame structure having longitudinally extending spaced apart members lying in the same plane, wheels rotatably mounted at one end of the spaced apart members to raise the first frame above a road level, said second frame extending transversely across the first frame structure and rotatably connected to pivot in a vertical arc relative to the first frame structure, a telescoping tube linkage connected to said other end of the first frame and reaching to be linked with said second frame structure, releasable locking means to retain said second frame structure in an elevated position, arcuate sector means connected to said second frame structure to pivot same, and means for pivoting the second frame structure relative to said first frame structure comprising a manually operable hoisting means, a flexible cable connected to said arcuate sector means on the second frame structure and the hoisting means whereby actuation of the hoisting means will raise or lower the second frame structure.

12. A trailer comprising a first frame structure and a second frame structure, said first frame having longitudinally extending spaced apart members lying substantially in the same plane, wheels rotatably mounted on the spaced apart members intermediate the ends to raise one end of the first frame structure a fixed distance from a road level, coupling means at the other end of the first frame structure to hitch the trailer to a vehicle, said second frame structure extending transversely between the first frame spaced apart members and rotatably connected thereto to swing in a vertical arc relative to said first frame structure, arcuate sectors vertically mounted to the ends of the second frame structure, flexible connector means cooperatively engaging the periphery of the sectors and extending forwardly, and a hoisting mechanism for receiving the forwardly extending flexible connector means to raise or lower the second frame structure.

13. A trailer comprising a first frame structure and a second frame structure, said first frame structure having longitudinally extending spaced apart members lying substantially in the same plane, said second frame structure extending transversely between the first frame spaced apart members and rotatably connected thereto to swing in a vertical arc relative to said first frame structure, an arcuate sector vertically mounted to the second frame structure, flexible connector means engaging the periphery of the sectors and extending forwardly, a hoisting mechanism receiving the forwardly extending flexible connector means to raise or lower the second frame structure, a telescoping tube linkage connected to said second frame structure and reaching forwardly to link with the forward section of the first frame structure, and releasable locking means to retain the telescoping tube linkage in a closed position thereby locking the second frame structure in an elevated position.

14. A trailer comprising a trailer frame, said frame having side frame members spaced apart from each other, ground engaging wheels rotatably mounted on one end of the frame members, a transverse load supporting member radially spaced and pivotally connected to the side frame members at said one end to elevate a load to the desired position, an arcuate drum sector connected to the transverse load supporting member, a flexible connector engaging the periphery of the drum sector, hoisting means for receiving said flexible connector whereby the length of the flexible connector will determine the elevation of the transverse load supporting member, and a telescoping linkage connected at one end to the transverse load supporting member, the other end of the telescoping linkage extending longitudinally and fastened to the other end of the frame members.

References Cited in the file of this patent

UNITED STATES PATENTS

| | | |
|---|---|---|
| 719,059 | Tabor | Jan. 27, 1903 |
| 922,841 | Bernstein | May 25, 1909 |
| 2,299,150 | Kennedy | Oct. 20, 1942 |
| 2,506,699 | Byrd | May 9, 1950 |
| 2,515,379 | Paine | July 18, 1950 |
| 2,595,289 | Peterson | May 6, 1952 |
| 2,610,865 | Cantrell | Sept. 16, 1952 |